Aug. 16, 1938.   G. C. GRAVES   2,126,990
METHOD OF MACHINING A WORM ELEMENT
Filed Sept. 13, 1934    2 Sheets-Sheet 1
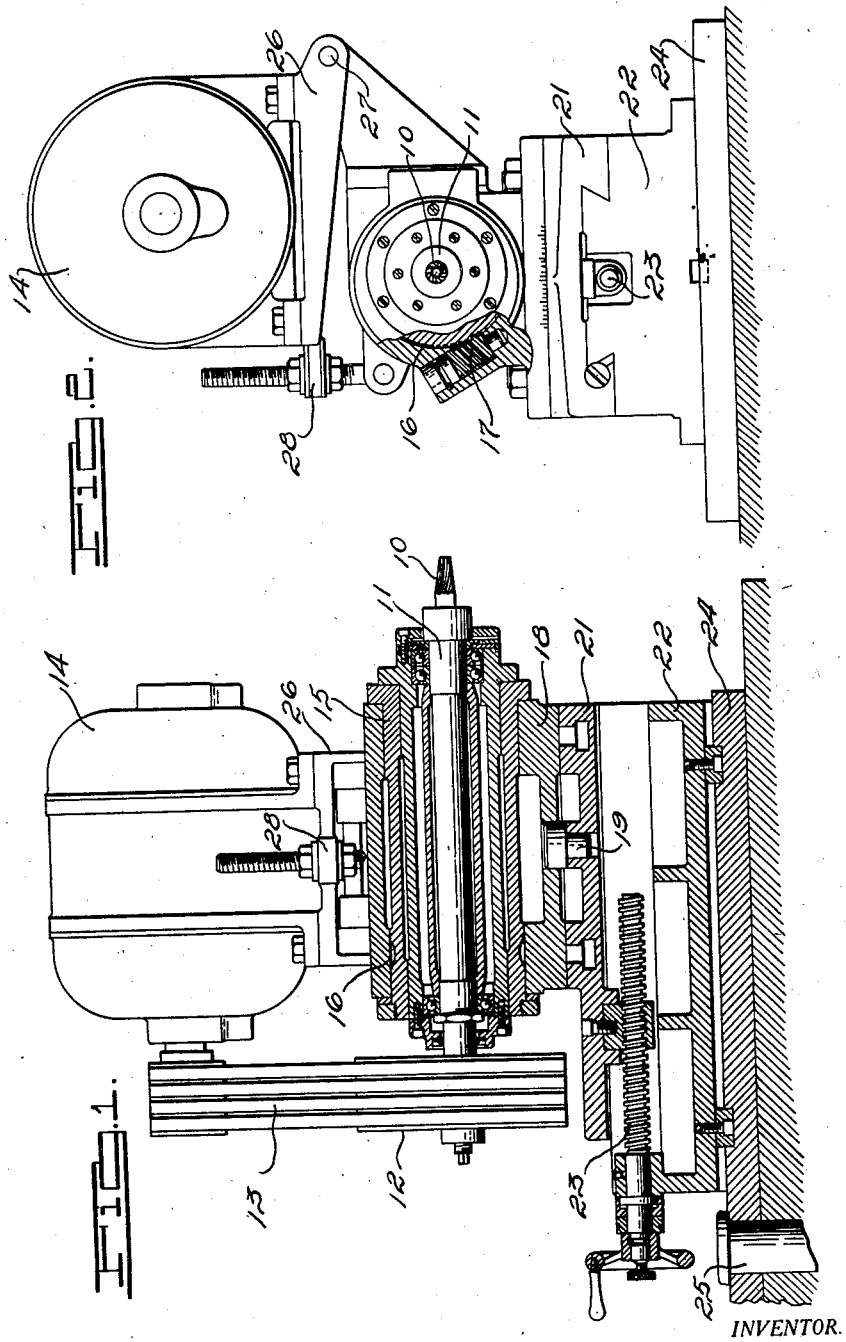
INVENTOR.
Grover C. Graves.
BY
ATTORNEYS.

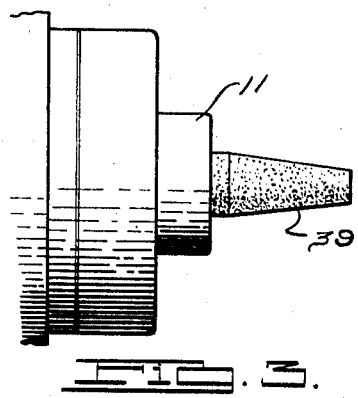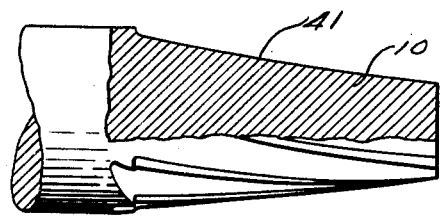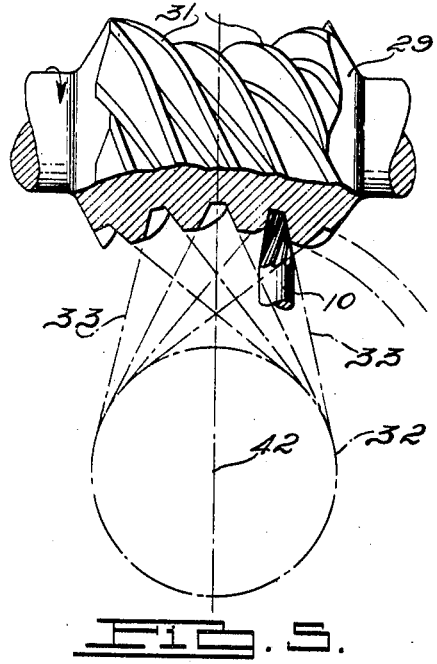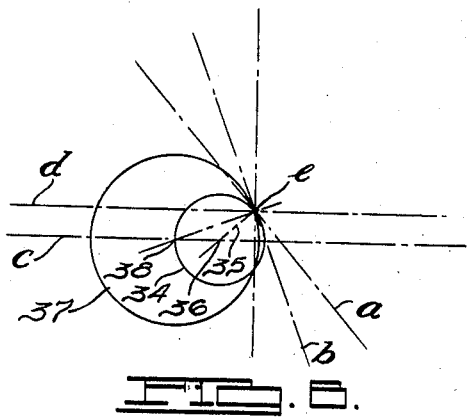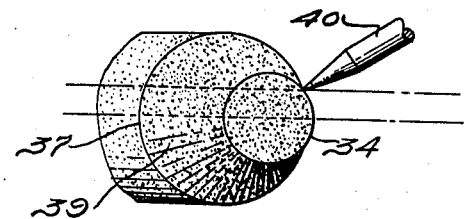

Patented Aug. 16, 1938

2,126,990

UNITED STATES PATENT OFFICE 2,126,990

METHOD OF MACHINING A WORM ELEMENT

Grover C. Graves, Detroit, Mich., assignor to Otto Lundell, Detroit, Mich., and George R. Scott, Norfolk, Va.

Application September 13, 1934, Serial No. 743,796

13 Claims. (Cl. 90—3)

My invention relates to tools and particularly to tools for accurately finishing the thread of a globoidal worm and to the method of dressing and employing said tools.

In the construction of tools for globoidal type of gearing as set forth in the application of George R. Scott, Serial No. 735,971, filed July 19, 1934, it is disclosed that the cutting must occur upon the central plane through the worm axis and on a line tangent to a circle to which the sides of the thread are tangent. This circle is chosen as the base circle of the worm. When employing an end mill cutter or a pencil grinding element of frusto-conic section for dressing the side of the threads of the worm with the axis of the tool disposed in a plane through the axis of the worm, it was found that a straight cutting line was not provided disposed on a line tangent to the base circle and in a plane through the axis of the gear. As a result a desired warped surface necessary for the efficient operation of the worm was not machined by such finishing tools.

In practicing my present invention, I take into consideration the fact that the helix angle at the top and bottom of the thread is different, due to the difference in radius from the axis of the worm. When considering this difference, I have been able to construct a tool resembling a slightly concaved, but generally frusto-conic, section. When the axis of this tool is disposed below or above the plane through the axis of the worm, a line on the tool cut by the plane through the axis of the worm will be a straight line. This line can be made to coincide exactly with the line tangent to the base circle and be disposed in the plane through the axis of the worm. The tool can be dressed along the line tangent to the base circle and in the plane of the worm axis and when applied to the work will cut as a tool in the above mentioned co-pending application on a line tangent to the circle and in the plane through the worm axis. When employing such a tool for finishing the thread of a worm or the teeth of a hob of globoidal shape, the further change in helix angle of the thread or teeth due to the different radii thereof must also be taken into consideration. When the space between the threads or teeth is large, a tool may be constructed which would be large enough to effect the cutting and at the same time be small enough to prevent any interference due to the change in the helix angle owing to the concave shape of the worm or hob. When the tool, however, must be made as large as possible to produce machining, some interference will occur due to the concave shape of the work. This is taken into consideration when forming or dressing the tool and a mean is chosen between the center and ends of the worm or hob at which points the dressing operation is performed. Toward the center and the end from this mean position, slight interference will occur because of the concave form of the work which will cause cutting to occur slightly above and below the central plane through the axis thereof. This, however, is a mean on each side of the plane through the axis which progressively passes from a maximum at the center through a zero point each side thereof to a maximum at the ends. The resulting error is well within the allowable error for a machining operation and produces a satisfactory form on the threads or teeth.

A unique fixture is provided for the gear cutting machine when employing a rotatable type of tool, one embodying a motor for driving the tool in rotation. The arbor for this tool is so mounted as to be adjustable in height and to be angularly positioned to have a side of the tool adjusted in the plane tangent to the base circle, all of which is mounted on a slide to permit the tool to be advanced forwardly and rearwardly relative to the worm. The fixture is adjusted on a rotatable table of the machine to have the centerline about which the tool is revolvable and the centerline of the base circle of the worm substantially coincide.

Accordingly, the main objects of my invention are; to provide a rotatable tool in the nature of an end mill cutter or a pencil stone with a straight cutting line disposed in the plane of the worm axis and on a line tangent to a base circle; to provide a generally frusto-conical tool having the side slightly concave with its axis spaced from the plane in which the cutting is to occur to provide a straight line cutting edge disposed on a tangent to a base circle within the plane; to provide a tool of the rotatable type having its axis positioned below or above the center-plane of the work to provide a straight line on the surface of the tool disposed in the plane; to dress the rotatable tool on a line spaced from the center-plane through the tool to provide a surface thereon which when disposed adjacent to the work will engage the surface thereof on a straight line in the plane through the axis of the work; to provide a fixture for the tool which rotates the tool and permits the tool to be adjusted in height and forwardly of its support; to provide a fixture for a tool which may be adjusted on a rotatable support in such manner as to regulate the distance between the rotatable center of the support of the tool and the axis of the worm; and, in general, to provide a means and method for accurately finishing the sides of the thread of a worm element which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a view, partly in section and partly in elevation, of a fixture and tool embodying features of my invention, Fig. 2 is a side view, partly in section, of the structure illustrated in Fig. 1.

Fig. 3 is an enlarged view of a tool, similar to that illustrated in the fixture of Fig. 1, showing a modified form thereof, Fig. 4 is an enlarged view of the tool illustrated in Fig. 1, partly in section, Fig. 5 is an enlarged view of a worm, partly in section, being machined by the tool illustrated in Fig. 1, Fig. 6 is a diagrammatical view of the method of constructing the tool illustrated in Fig. 4, and Fig. 7 is a view similar to Fig. 6 showing the developed tool and the method by which it is dressed.

Referring to Figs. 1 and 2, I have illustrated a tool 10 in the nature of an end mill cutter which embodies features of my invention. The tool is mounted in a rotatable arbor 11 having a pulley 12 on the opposite end which is driven by a belt 13 from a motor 14 mounted on the top of the fixture. The arbor is mounted in a rotatable sleeve 15 having threads 16 thereon which are engaged by a worm 17 by which the sleeve 15 is rotated. The rotation of the sleeve adjusts the arbor 13 in height since the axis of the sleeve 15 and that of the arbor 13 are in eccentric relation, as illustrated in Fig. 2. The sleeve 15 is mounted in a housing 18 which is revolvable about a pin 19 to have the arbor disposed at a desired angle relative to the work. The housing 18 is carried by a slide 21 which is adjustable on a base 22 by a lead screw 23 in a conventional manner. The base 22 is mountable on a rotatable platform 24 at a predetermined distance from a central pivot 25 to position the tool 10 relative to the axis of the worm to be machined. The motor 14 is mounted on a base 26 which is pivoted at 27 at the top of the housing 18 and is supported on the opposite side, at 28, on a screw by which the motor is raised or lowered to regulate the tension on the belt 13 relative to the positioning of the arbor 11 in the sleeve 15. The tool holding device thus constructed is simple and compact and provides all the necessary adjustment features to set the tool 10 in exact desired relation to the work.

In Fig. 5, I have illustrated a worm element 29 to be machined having a plurality of helically disposed threads 31 thereon. The worm is of the globoidal type, that is to say, the top edges of the thread 31 are disposed on a circle while the threads are warped in the desired manner. The method of constructing such a globoidal type of worm has been clearly described and set forth in the patent to Cone issued November 1, 1932, Patent No. 1,885,686. To produce the desired helical surface on the threads, the cutting must occur on a line tangent to a circle to which the sides of the threads are tangent and in a plane through the axis of the worm element.

It has been attempted, heretofore, to obtain such surfaces through the employment of a tool of frusto-conic shape by having the central plane of the tool disposed in the central plane of the worm wheel. The desired form was not produced in this manner and it was only through the positioning and the formation of the tool as will now be described, that successful finishing could be effected on the sides of the threads.

In Fig. 5, a base circle 32 is shown from which tangents 33 extend and are parallel to the sides of the threads in a plane through the axis of the worm. The problem now to be solved is to so dispose the cutting tool and so shape the surface thereof as to provide a line contact falling on a tangent line 33 in the plane through the worm axis as illustrated by the tool 10 of Fig. 5.

It was realized that the helix angle of the thread changes with the distance from the axis of the worm element so that a greater helix angle will be present at the bottom of the thread than will be formed at the top. This difference is shown in Fig. 6 by the dot-and-dash lines $a$ and $b$, respectively. Line $a$ illustrates a helix angle at the bottom of the thread while line $b$ illustrates the helix angle at the top of the thread. A circle 34 is laid out tangent to the line $a$ having the radius 35 normal to the line and having the center 36 disposed at such distance from the tangent line as to be slightly less than one half of the width between the base of the threads. In a similar manner, a circle 37 is laid out tangent to the line $b$ with its center-line 38 falling on a line $c$ which is parallel to the line $d$ representing the plane through the axis of the worm. All of the lines intersect at a point $e$ which represents a line extending normal to the paper and conforms with a line 33 which is tangent to the circle 32 and disposed in the plane $d$.

In Fig. 7 I have illustrated a tool in the nature of a pencil grinding wheel 39 produced from the circles 37 and 34 as developed by the method illustrated in Fig. 6.

It is well known that when a plane is passed through a cone parallel to a plane through the axis, that a conic section in the shape of a hyperbola is formed. The edges of the section cut by the plane will therefore be curved. When we consider a plane $d$ passing in the same manner through a section similar to a conic section but forming a straight line at $e$ it is evident that the intersection of the plane $c$ through the axis will not produce a straight line but will be slightly concaved. This is illustrated by the edge 41 at the sectioned portion of Fig. 4 which represents the plane $c$.

It is very apparent, therefore, that when dressing along the straight line 33, at $e$, a straight line will be dressed along the surface of the cutting portion of the tool which will present a straight line to the work when the tool and work engage each other at the point $e$. Such dressing is illustrated in Fig. 7 wherein the pencil stone 39 is disposed as developed in Fig. 6 and is dressed along the line $e$ by a diamond 40.

Therefore, when employing the tool 10, or the pencil stone 39, it will be necessary to have the central plane through the tool disposed below or above the plane $d$ through the axis of the work depending upon which side of the thread is being worked upon. When the slope of the thread is that illustrated by lines A and B of Fig. 6, then the central axis of the arbor 11 and of the tool is disposed below the central plane D through the work. If, after finishing one side of the thread 31 of the worm the fixture is adjusted to cut the opposite side of the thread with the worm remaining in its original position, in view of the reverse slope of the thread it will be necessary to move the central plane of the tool above the plane D through the axis of the work to effect the same line contact with that side of the thread. Another method of finishing the opposite side of the thread would be to reverse the worm wheel end for end, through 180 degrees, at which instance the tool would remain in its original position with the unfinished side of the thread falling in the position of the side originally machined.

As has been pointed out hereinabove, the concave shape of the worm or hob effects a further change in the helix angle of the thread. When the tool is made as large as possible to operate between the threads, the circular form thereof at various points throughout its length may become tangent to the thread, due to the change in helix angle, slightly above and below the axial plane through the work. The point of dressing is chosen half way between the center and end of the worm or hob, so that any shifting of the line on which machining is effected will occur both above and below the axial plane to minimize the variation.

It will readily be apparent upon examining Fig. 5 that the fixture illustrated in Figs. 1 and 2 is desirable. The center of the point 25 will coincide with the center 42 of the base circle 32 and the end of the tool 10 will be substantially at the desired distance from the center axis of the worm wheel. The lead screw 23 may then be adjusted to obtain the correct position of the tool and the housing 18 may be turned about the pivot 19 to dispose the side of the tool 10 in the tangent 33 of the base circle. With the tool dressed in the manner above explained and mounted in the fixture, no difficulty is experienced in positioning the tool in desired relation to the thread to have the line upon which the dressing occurs fall exactly in the plane D through the axis of the worm and on the tangent 33. As a result the rotatable tool machines in the same manner as a straight edge, cutting on the tangent 33 and in the plane D. In this manner, accurate finishing of the side surfaces of the thread of the worm can be effected where heretofore it was substantially impossible to obtain a desired smooth and accurate finish.

In the foregoing description and in the appended claims the term "frusto-conic" is employed as describing the shape of the disclosed tools. It will be appreciated that in such instances the term "frusto-conic" is not used in its strict geometric sense, in view of the non-linear form of the sides thereof, but is instead used in a general sense as describing the general form of the tool body. In the claims, the terms "machining" and "finishing" are used, and it will be appreciated that these terms are used in an equivalent and a generic sense, as having reference to any suitable grinding, cutting, or other dressing, machining, or finishing operation.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. The method of finishing the helical sides of an element which includes the steps of, contacting a line on the side of the tool extending axially thereof and in a non-coplanar relation to the axis of the tool with a line on the helical side disposed in a plane through the axis of the element, rotating said element, and relatively advancing arcuately said tool and element in the plane through the axis of the element as the tool and element are rotated.

2. The method of machining the thread of a worm element which includes, rotating a tool having a line dressed thereon extending axially of and in non-coplanar relation to the axis of said tool, and machining said thread with the line so dressed disposed substantially in a plane through the axis of said worm.

3. The method of machining a thread of a worm the sides of which thread in a plane through the worm axis are disposed on tangents to a circle in said plane which includes the steps, of rotating a tool having a line dressed thereon extending axially of and in non-coplanar relation to the axis of said tool, and machining said thread with said line so dressed substantially in the plane through the axis of said worm and disposed on a tangent to said circle.

4. The method of finishing the sides of helically disposed projections of a concave rotatable element, which sides in the plane through the axis of the element are disposed on a tangent to a circle in said plane, which includes the steps of rotating a tool, contacting a line on said tool extending axially thereof and in non-coplanar relation to the axis of said tool with a side of said projection in the plane through the axis of said element, and machining said element as the tool is advanced on the arc of said circle.

5. The method of finishing the sides of helically disposed teeth of a hob, which sides in the plane through the axis of the hob are disposed on a tangent to a circle in said plane which includes the steps, of rotating a tool having a line dressed thereon extending axially thereof and in non-coplanar relation to the axis of said tool, and machining said sides with said line so dressed substantially in the plane through the axis of said hob and disposed on a tangent to said circle.

6. The method of machining the helical thread of a worm element, said helical thread being so formed that a first tangent line adjacent the root thereof is at an angle to a second tangent line adjacent the crown thereof, which includes utilizing a rotatable tool having a surface dressed thereon, rotating said tool, and disposing said tool so that one end portion of said surface rotates about the center of a circle to which said first line is tangent and the other end portion of said surface rotates about the center of a circle to which said second line is tangent.

7. The method of machining the threads of a worm the sides of which threads in a plane through the worm axis are to be disposed on a tangent to a circle in said plane which includes the steps, of mounting a tool for rotation, rotating said tool, adjusting said tool to have its sides substantially coincident to a tangent to said circle when revolvable about the center of said circle, disposing the axis of said tool in a plane spaced from but parallel to a plane through the axis of said worm, and dressing said thread by a line on said tool dressed in the plane of said worm axis.

8. The method of machining the threads of a worm the sides of which threads in a plane through the worm axis are to be disposed on a tangent to a circle in said plane which includes the steps, of mounting a tool for rotation, rotating said tool, adjusting said tool to have its side substantially co-incident to a tangent to said circle when revolvable about the center of said circle, disposing the axis of said tool in a plane spaced from but parallel to a plane through the axis of said worm, to have a line dressed on said tool fall in a plane through the axis of said worm and on a tangent to said circle, and machining the thread of said worm when so engaged by said line.

9. The method of machining the thread of a worm element which includes the steps, of rotating a frusto-conical tool having a concave surface on its side, and machining said thread when the side is so disposed in the plane of said worm axis as to have all points on said side intersected by said plane disposed in a straight line.

10. The method of machining the thread of a worm element which includes the steps, of rotating a frusto-conical tool, having a concave surface on its side, and machining said thread when the side is so disposed relative thereto as to have the axial plane of the worm intersect a straight line on said side.

11. The method of finishing the sides of helically disposed teeth of a globoidal hob, which sides in the plane through the axis of the hob are disposed on a tangent to a circle in said plane which includes the steps, of mounting a tool for rotation, rotating said tool, adjusting said tool to have its sides substantially coincident to a tangent to said circle when revolvable about the center of said circle, disposing the axis of said tool in a plane spaced from but parallel to a plane through the axis of said hob, to have a line dressed on said tool fall in a plane of the axis of said hob and on a tangent to said circle, and machining the sides of the teeth of said hob when so engaged by said line.

12. The method of finishing the sides of helically disposed teeth of a globoidal hob, which sides are disposed on a tangent to a circle which includes the steps, of rotating a frusto-conical tool, having a concave surface dressed on the side thereof, and disposing said tool relative to the teeth of the hob to have the axial plane of the hob intersect a straight line on said tool, and rotating said hob as the tool is advanced in said axial plane on the arc of said circle.

13. The method of machining the thread of a worm element which includes, rotating a tool having a straight line dressed thereon in non-coplanar relation to the axis of said tool, and machining said thread with said straight line disposed substantially in a plane through the axis of said worm.

GROVER C. GRAVES.